ANDREW FULLER & L. P. REICHERT.
Improvement in Refrigerators.
No. 4,645. Reissued Nov. 28, 1871.
Fig. I.
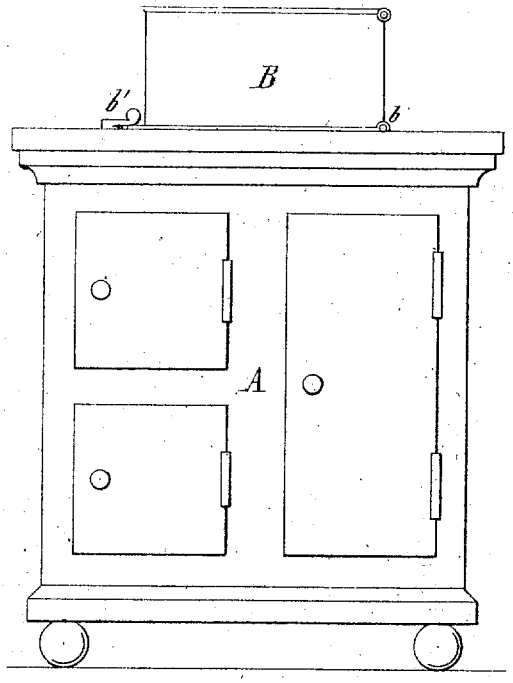
Fig. II.
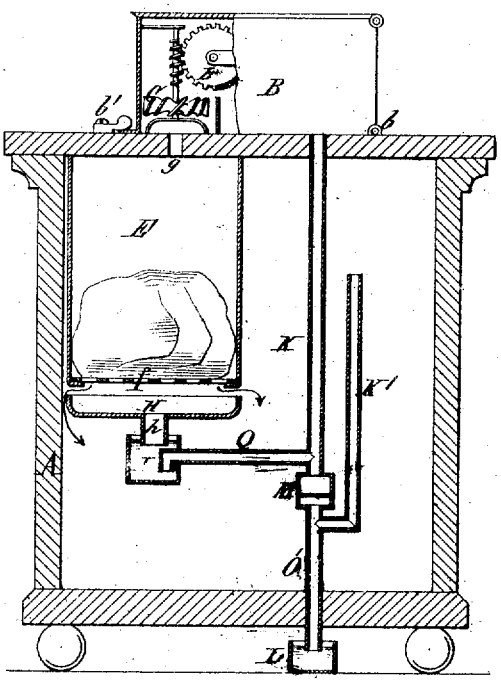
Wm. C. W. Intire
John Tyler
Witnesses
Andrew Fuller & L. P. Reichert Inventor
by Jay Hyatt atty

UNITED STATES PATENT OFFICE.

ANDREW FULLER AND LOUIS P. REICHERT, OF BUFFALO, NEW YORK.

IMPROVEMENT IN REFRIGERATORS.

Specification forming part of Letters Patent No. 74,813, dated February 25, 1868; reissue No. 4,645, dated November 28, 1871.

*To all whom it may concern:*

Be it known that we, ANDREW FULLER and LOUIS P. REICHERT, of the city of Buffalo, in the county of Erie and State of New York, have invented certain Improvements in Refrigerators, of which the following is a specification:

Previous to our invention a fan or other suitable air-blowing apparatus had been employed in connection with both refrigerators and dwelling apartments for inducing a forced circulation of air into and through the same; but, so far as we are aware, such apparatus was used to introduce or withdraw air from the refrigerator or other compartment which necessarily had a passage communicating with the external air. Our invention relates to that class of refrigerators which has no passage or communication with the air outside. Our invention consists: First, in the combination, with a closed refrigerator or other chamber having no communication with the external air, and an ice-box, of a fan or other equivalent air-forcing apparatus, by which a forced circulation of the air brought in contact with the ice is maintained within the compartments. Second, in the combination, with such closed refrigerator, ice-box, and air-forcing apparatus, of a receptacle containing charcoal, or charcoal and water, or other equivalent purifying substance or substances, in such a manner that the air, as it is forced to circulate within the refrigerator or other compartments will be brought successively in contact with the ice and said purifying substance. Third, in the arrangement, within a refrigerator provided with fan, ice-box, and purifying-chamber, of an air-pipe, whereby the air as it circulates is compelled to pass through the purifying material. Fourth, in the combination and arrangement, in a closed refrigerator provided with fan and ice-box, of a water-drip pipe, purifying compartment, and air-pipe, whereby the water as it drips from the ice-box is compelled to pass through the purifying substance before it escapes from the refrigerator.

In the accompanying drawing Figure I represents a front view, and Fig. II a sectional elevation of our improved apparatus.

Like letters designate like parts in each of the figures.

A represents a refrigerator of any ordinary construction. The fan is represented in the drawing arranged in a tight casing, B, which is hinged to the top of the refrigerator at *b*, to which it is tightly secured by any suitable locking device, *b'*. C represents a rotary fan-wheel, arranged in the casing B, and rotated by a train of wheels, D, operated by means of a spring or weight in a manner similar to a clock mechanism. E is the ice-box or chamber, provided at its bottom with a sliding grate, *f*, preferably of galvanized iron, on which the ice rests. *g* is an aperture leading from the fan-chamber into the ice-box. H is a pan arranged below the ice-box, which receives the water as it drips from the ice, from which it descends, through a spout, *h*, into a cup, I. K is a vertical pipe communicating through the top of the refrigerator with the fan-chamber. At the lower end of this pipe is formed a chamber, M, which contains the pulverized charcoal or other purifying substance supported on a perforated plate. K' is a pipe connected at the bottom of the chamber M, and terminating near the top of the refrigerator in an open end. O is the horizontal drip-pipe connecting the cup I with the pipe K. The bent end of the pipe O terminates near the bottom of the cup I, so that the water in the cup will form a trap and prevent the air from passing directly from the ice-box into this pipe. O' is a vertical portion of the drip-pipe, which descends through the bottom of the refrigerator into a cup, L, which also forms a trap to prevent the ingress of the air through this drip-pipe.

The operation of our improvements is as follows: The fan being set in motion, the air is forced through the aperture *g* into the ice-chamber, and in contact with the ice therein, from whence the now cooled air escapes at the bottom into the main compartment of the refrigerator, (as indicated by the arrows,) where, by reason of its greater gravity, it descends to the bottom. As it rises it is drawn by the action of the fan into the pipe K', which conducts it to the bottom of the chamber M and up through the purifying substance contained therein, which absorbs the vapors and other impurities with which the air is charged. The air thus purified passes upward through the pipe K into the fan-chamber, from whence it is again forced by the fan into the ice-box, and the operation repeated. The water which drips from the ice passes from the cup I through pipe O into the purifying-chamber, through which it filters, passing thence through the pipe O′ out of the refrigerator. By confining the air within the refrigerator and excluding the warm external air a great saving of ice is effected, while the forced circulation of the air in connection with the purifying-chamber enables a lower temperature of the air to be maintained while it is kept comparatively pure.

What we claim as our invention is—

1. The combination, with a refrigerating chamber having no communication with the external air, and an ice-box, of a fan or other equivalent air-forcing apparatus, whereby the air is forced to pass in a circuit over or in contact with the ice, and through the refrigerating compartment, substantially as hereinbefore set forth.

2. The combination, with such closed refrigerating compartment, ice-box, and air-forcing apparatus, of a vessel or chamber containing charcoal or other purifying substance in such a manner as to cause the air as it is forced to circulate within said refrigerating compartment to pass successively in contact with the ice and purifying substance, substantially as hereinbefore set forth.

3. The combination, within a closed refrigerator provided with an air-forcing apparatus and a purifying-chamber, of an ice-box, and air-pipe K, whereby the air, as it circulates is compelled to pass through said purifying-chamber, substantially as shown and described.

4. The combination and arrangement within a closed refrigerator, provided with a fan and ice-box, of the water-drip pipe O O′, purifying-chamber M, and air-pipe K K′, whereby the water which drips from the ice is compelled to pass through the purifying material before it escapes from the refrigerator, as hereinbefore set forth.

ANDREW FULLER.
LOUIS P. REICHERT.

Witnesses:
EDWARD WILHELM,
JNO. J. BONNER.

(58)